Feb. 15, 1966    F. BUFF    3,234,836
APPARATUS FOR CUTTING POLYURETHANE FOAM AND THE LIKE
Filed May 15, 1963

INVENTOR.
Fred Buff
BY
Curtis, Morris & Safford
ATTORNEYS

United States Patent Office 3,234,836
Patented Feb. 15, 1966

3,234,836
APPARATUS FOR CUTTING POLYURETHANE FOAM AND THE LIKE
Fred Buff, Paramus, N.J., assignor to General Foam Corporation, New York, N.Y., a corporation of New York
Filed May 15, 1963, Ser. No. 280,660
5 Claims. (Cl. 83—422)

This invention relates to forming layers of plastic foam, and more in particular to slitting or cutting a large block of such foam in a manner to improve the quality of the final product and also to decrease the overall cost. The invention also relates generally to slitting or slicing slabs or sheets from large blocks or bodies of flexible materials and particularly flexible plastic foams.

An object of this invention is to provide simplified means for producing products of flexible plastic foam. A further object is to provide improved means for forming highly flexible products using slitting or slicing operations. Another object is to provide improved means for increasing the quality and the relative yield of finished foam products. A further object is to provide for the above in such a way as to insure uniform high-quality with reduced variations in the dimensions of the products. A further object is to provide for the above with apparatus which is simple and sturdy in construction, versatile in use and adaptable to meet the different problems encountered in this type of manufacturing operation. These and other objects will be in part obvious and in part pointed out below.

Figure 1:
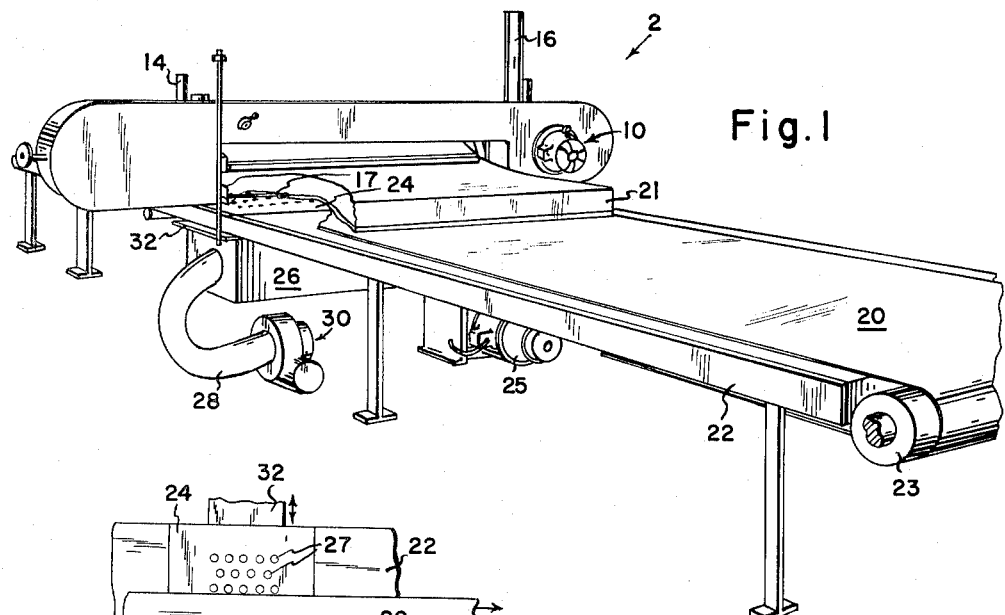
Figure 2:
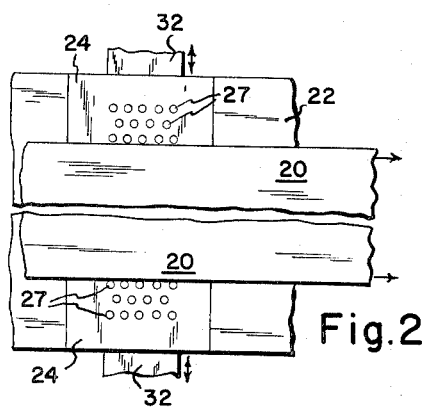
Figure 4:
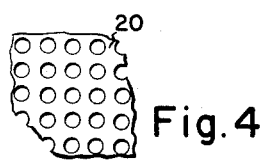
Figure 3:
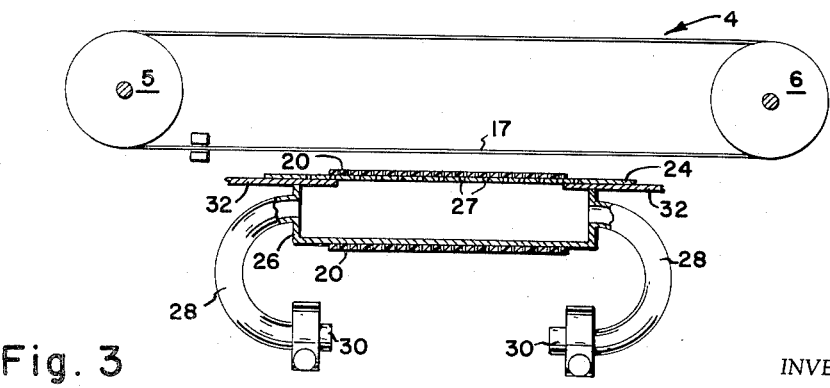

In the drawings:
FIGURE 1 is a perspective view of one embodiment of the invention;
FIGURE 2 is a fragmentary horizontal view of a portion of the machine at the center of FIGURE 1;
FIGURE 3 is a vertical transverse section of the machine of FIGURE 1; and,
FIGURE 4 is a greatly enlarged fragmentary view of a portion of the conveyor belt.

Polyurethane foam is produced in large blocks, which tend to have irregular surfaces, particularly in that the top and end or side walls may have a relatively heavy uneven "skin," and the center may be considerably higher than the ends. Such foam is very light in weight and very flexible, and it is difficult to hold the block and perform cutting or slitting operations without considerable distortion of the block. The distortion tends to carry or extend through the block so that, even though the cutting has been carefully controlled and in a single plane, nevertheless the final product may have a very uneven surface. Very serious problems are encountered in splitting or slitting a block into thin sheets or slabs. It is an object of the present invention to provide for a completely satisfactory method and apparatus for overcoming these difficulties, and to produce products of uniform high-quality from flexible foams.

Referring to FIGURES 1 and 3 of the drawings, a splitting or cutting machine 2 has an endless band knife or cutter 4 which is supported upon a pair of pulleys 5 and 6 and is driven at a rapid rate by an electric motor and speed-reduction driving unit 10. The entire pulley and knife assembly is mounted upon vertical posts 14 and 16 (FIGURE 1) and this entire assembly may be raised and lowered so as to position the lower run 17 of the knife at the desired level. Directly beneath the lower run of the knife is an endless belt conveyor 20 which is adapted to carry a block 21 of foam past the knife thus to slit or cut the block. Conveyor 20 is also reversible so that the block can be moved back and forth past the knife. Belt 20 is supported at its ends by a pair of sheaves or pulleys 23 and is driven by an electric motor through a reduction unit. Belt 20 is a perforated plastic belt and it rests upon a stationary platform 22 which presents a continuous smooth surface throughout the length of the conveyor. However, platform 22 has a rectangular plate 24 positioned directly beneath knife run 17 and extending from one edge of belt 20 to the other. Illustratively, plate 24 is twelve inches wide and is provided with a strip of round perforations 27 which constitute a substantial percentage of an area five inches wide and having its center line directly beneath knife run 17.

Directly beneath plate 24 and above the bottom run of belt 20 there is a suction box 26 (see also FIGURE 3) which has side, end, and bottom walls which completely enclose the bottom surface of plate 22 throughout the area of the perforations 27. Connected to the opposite ends of suction box 26 are two suction lines 28, each of which extends to a suction blower 30. Blowers 30 operate together to produce a partial vacuum condition within the suction box so that air is drawn from above conveyor 20 downwardly through the conveyor and suction plate 24 and its passes from the opposite ends of the suction box to the blowers. Hence, when a block or layer of foam is resting on the conveyor 20 and is moved over the suction box, the partial vacuum holds the foam tightly against the conveyor. Therefore, the leading edge of the foam is securely held against the conveyor as it approaches knife run 17. As the cutting operation proceeds, the body or layer of foam is held securely throughout the entire zone of the cutting operation. This insures that the foam is cut at a steady rate in a plane which is parallel to the top surface of plate 24.

At each side of the conveyor and beneath the end of plate 24 there is a slide 32 which may be slid from the side of platform 22 inwardly to cover a selected portion of the perforations in the plate. In this way the width of the suction zone may be adjusted to the width of the foam being cut. After the body of foam passes the cutter, the layer which has been cut from the bottom may be removed and the body of foam will then rest upon the bottom surface for carrying on another cutting operation. In performing this, the cutter assembly may be elevated and the conveyor reversed so that the body of foam is on the other side of the cutter. The cutting operation may then be repeated. It is also contemplated that two or more such cutters may be used in tandem. Also, under some circumstances the cutter blade may be double edged so that a second cutting operation may be performed by reversing the conveyor.

It has been found that the holding of the body or layer of foam in the manner of the present invention produces products of extreme uniformity and thickness and with flat surfaces. The amount of suction is regulated so as to insure that the foam is properly held without causing difficulties. The foam is held firmly to the conveyor throughout a rectangular area which is sufficiently large to avoid any substantial distortion in the shape of the body of foam. The conveyor provides a flat surface and the knife produces a straight cut at a predetermined distance from that surface. A body of foam or even a relatively thin slab or sheet may be slit with this machine without the difficulties which have been encountered with such operations in the past. The operation is fast and economical. While the specific embodiment of the invention has been constructed for use in slitting or cutting polyurethane foam to produce layers or sheets of various thicknesses throughout a wide range, the machine has other uses within the scope of the invention. The present invention provides for economic utilization of blocks or layers of foam. For example, when a block of foam has one or more irregular surfaces and a relatively flat one, as is true of a large "loaf" or "bun" which has a concave top surface, the block is placed with the relatively flat surface resting on the conveyor. The first cut produces an extremely flat supporting surface and thereafter each cut produces a layer of extremely uniform thickness, even at the top where the irregular shape causes a substantial reduction at the area of the layer. Also, a relatively thin layer of foam may be slit with extreme accuracy so that very high tolerances may be maintained.

As various embodiments may be made of the above invention and as changes may be made in the embodiments above set forth, it is to be understood that the matter hereinbefore set forth or shown in the accompanying drawings is to be interpreted illustratively and not in a limiting sense.

I claim:
1. In apparatus of the character described, the combination of, a perforated conveyor belt, means mounting said conveyor belt to carry a body of plastic foam or the like upon a supporting surface through a cutting or slitting zone, a suction box having a top wall structure with openings therethrough and along which said conveyor belt passes, suction blower means creating a partial vacuum condition within said suction box thereby to produce a partial vacuum condition through said openings and the coextensive portion of said conveyor belt within an area which includes said cutting and slitting zone whereby the body of foam is held firmly to said conveyor belt, and adjustable means to close selected of said openings thereby to restrict the area of the partial vacuum condition through said conveyor belt.

2. Apparatus as described in claim 1 wherein said wall structure is a perforated plate and wherein said adjustable means comprises slide means positioned along the lower surface of said perforated plate.

3. Apparatus as described in claim 1 which includes a cutter assembly positioned within said cutting or slitting zone and comprising an endless knife having a cutting run extending transversely of the conveyor within said area whereby the foam is cut while held firmly by said partial vacuum condition, means for operating said knife, and means to adjust the relative position of said knife with respect to said conveyor belt.

4. Apparatus as described in claim 1 wherein said conveyor belt is an endless plastic belt having small perforations therein.

5. Apparatus as described in claim 1 wherein said conveyor belt moves substantially horizontally when passing through said cutting or slitting zone, a horizontal cutter extending transversely of said conveyor belt within said zone and adjacent to said conveyor belt, and a body of polyurethane foam or the like which is very light in weight and very flexible positioned upon said conveyor belt to be carried through said cutting and slitting zone.

References Cited by the Examiner

UNITED STATES PATENTS

| 1,155,727 | 10/1915 | Harwood | 83—402 X |
| 1,383,133 | 6/1921 | Lucke | 83—4 |
| 3,025,741 | 3/1962 | Wagner | 83—201 X |

FOREIGN PATENTS

| 1,121,027 | 1/1962 | Germany. |
| 883,143 | 11/1961 | Great Britain. |

WILLIAM W. DYER, JR., *Primary Examiner.*

WILLIAM S. LAWSON, *Examiner.*